United States Patent
Sakamoto et al.

(10) Patent No.: US 9,672,016 B2
(45) Date of Patent: Jun. 6, 2017

(54) PROCESS EXECUTION METHOD AND INFORMATION PROCESSING APPARATUS

(71) Applicant: FUJITSU LIMITED, Kawasaki-shi, Kanagawa (JP)

(72) Inventors: Takuya Sakamoto, Kawasaki (JP); Kazuaki Nimura, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 24 days.

(21) Appl. No.: 14/660,526

(22) Filed: Mar. 17, 2015

(65) Prior Publication Data

US 2015/0331678 A1 Nov. 19, 2015

(30) Foreign Application Priority Data

May 15, 2014 (JP) ................................ 2014-101437

(51) Int. Cl.
*G06F 9/45* (2006.01)
*G06F 9/44* (2006.01)

(52) U.S. Cl.
CPC .............. *G06F 8/41* (2013.01); *G06F 9/4421* (2013.01)

(58) Field of Classification Search
None
See application file for complete search history.

(56) References Cited

U.S. PATENT DOCUMENTS

| 5,822,591 A * | 10/1998 | Hochmuth | G06F 8/30 |
| | | | 712/E9.084 |
| 6,457,176 B1 * | 9/2002 | King | G06F 8/51 |
| | | | 717/173 |
| 6,842,894 B1 * | 1/2005 | Havemose | G06F 9/541 |
| | | | 717/148 |

(Continued)

FOREIGN PATENT DOCUMENTS

| JP | 2002-163115 | 6/2002 |
| JP | 2007-179153 | 7/2007 |

(Continued)

OTHER PUBLICATIONS

Stefanov, Currying and Partial Functions in JavaScript, Dr. Dobb's, Oct. 2011.*

(Continued)

*Primary Examiner* — Insun Kang
(74) *Attorney, Agent, or Firm* — Fujitsu Patent Center

(57) ABSTRACT

A non-transitory computer-readable recording medium has a program stored therein for causing a computer to execute a process of processing a program by repeating analysis and execution of a source code having been read. The process includes associating, when the source code includes a definition of a function, a function name identifying the function, with an intermediate representation of the source code corresponding to the function, to be stored; determining whether the intermediate representation having the function associated is stored, when calling the function; executing a procedure corresponding to the function, by using the inter- (Continued)

mediate representation, when the intermediate representation is stored; and generating the intermediate representation by analyzing the source code corresponding to the function, when the intermediate representation is not stored.

13 Claims, 12 Drawing Sheets

(56) References Cited

U.S. PATENT DOCUMENTS

| | | | | |
|---|---|---|---|---|
| 7,406,687 | B1* | 7/2008 | Daynes | G06F 9/44521 717/118 |
| 9,038,038 | B1* | 5/2015 | Jai | G06F 8/65 717/139 |
| 2004/0168162 | A1* | 8/2004 | Park | G06F 9/45516 717/166 |
| 2005/0114355 | A1* | 5/2005 | Nuttila | H04L 41/0226 |
| 2005/0216899 | A1* | 9/2005 | Muthukumar | G06F 8/445 717/151 |
| 2007/0226715 | A1* | 9/2007 | Kimura | G06F 9/45516 717/148 |
| 2008/0270984 | A1* | 10/2008 | Tsutsumitake | G06F 9/45512 717/115 |
| 2009/0100410 | A1* | 4/2009 | Pouliot | G06F 8/75 717/122 |
| 2009/0178031 | A1* | 7/2009 | Zhao | G06F 8/427 717/143 |
| 2009/0199168 | A1* | 8/2009 | Hamada | G06F 8/443 717/151 |
| 2009/0222798 | A1 | 9/2009 | Iguchi et al. | |
| 2009/0271775 | A1* | 10/2009 | Barsness | G06F 9/45516 717/151 |
| 2010/0095284 | A1* | 4/2010 | Herring | G06F 9/4552 717/148 |
| 2010/0229165 | A1* | 9/2010 | Normington | G06F 9/445 717/166 |
| 2011/0082984 | A1* | 4/2011 | Yuan | G06F 17/30902 711/147 |
| 2011/0131556 | A1* | 6/2011 | Tatsubori | G06F 8/30 717/137 |
| 2011/0173597 | A1* | 7/2011 | Cascaval | G06F 9/44505 717/148 |
| 2011/0239185 | A1* | 9/2011 | Brown | G06F 17/2705 717/105 |
| 2011/0283256 | A1* | 11/2011 | Raundahl Gregersen | G06F 8/67 717/108 |
| 2012/0072891 | A1* | 3/2012 | Hewitt | G06F 8/43 717/143 |
| 2012/0185834 | A1* | 7/2012 | Ohrstrom | G06F 9/45504 717/148 |
| 2015/0178055 | A1* | 6/2015 | Fee | G06F 9/5027 717/146 |
| 2015/0212803 | A1* | 7/2015 | Clifford | G06F 8/4443 717/146 |

FOREIGN PATENT DOCUMENTS

| | | |
|---|---|---|
| JP | 2009-211190 | 9/2009 |
| JP | 2013-516720 | 5/2013 |
| WO | 2011/087993 | 7/2011 |

OTHER PUBLICATIONS

Zander, Functional Programming in Java, Nov. 2005.*
Simon L et al: "Implementing Functional Languages: a tutorial", Mar. 23, 2000 (Mar. 23, 2000), XP055215719, Retrieved from the Internet: URL: http://www.cse.iitb.ac.in/~as/fpcourse/PJ_DL_book.pdf [retrieved on Sep. 23, 2015] *p. 44-p. 45* *p. 97* *p. 105* *p. 115* *p. 166*.
EESR—Extended Search Report dated Oct. 6, 2015 issued with respect to the corresponding European Patent Application No. 15158074.3.

* cited by examiner

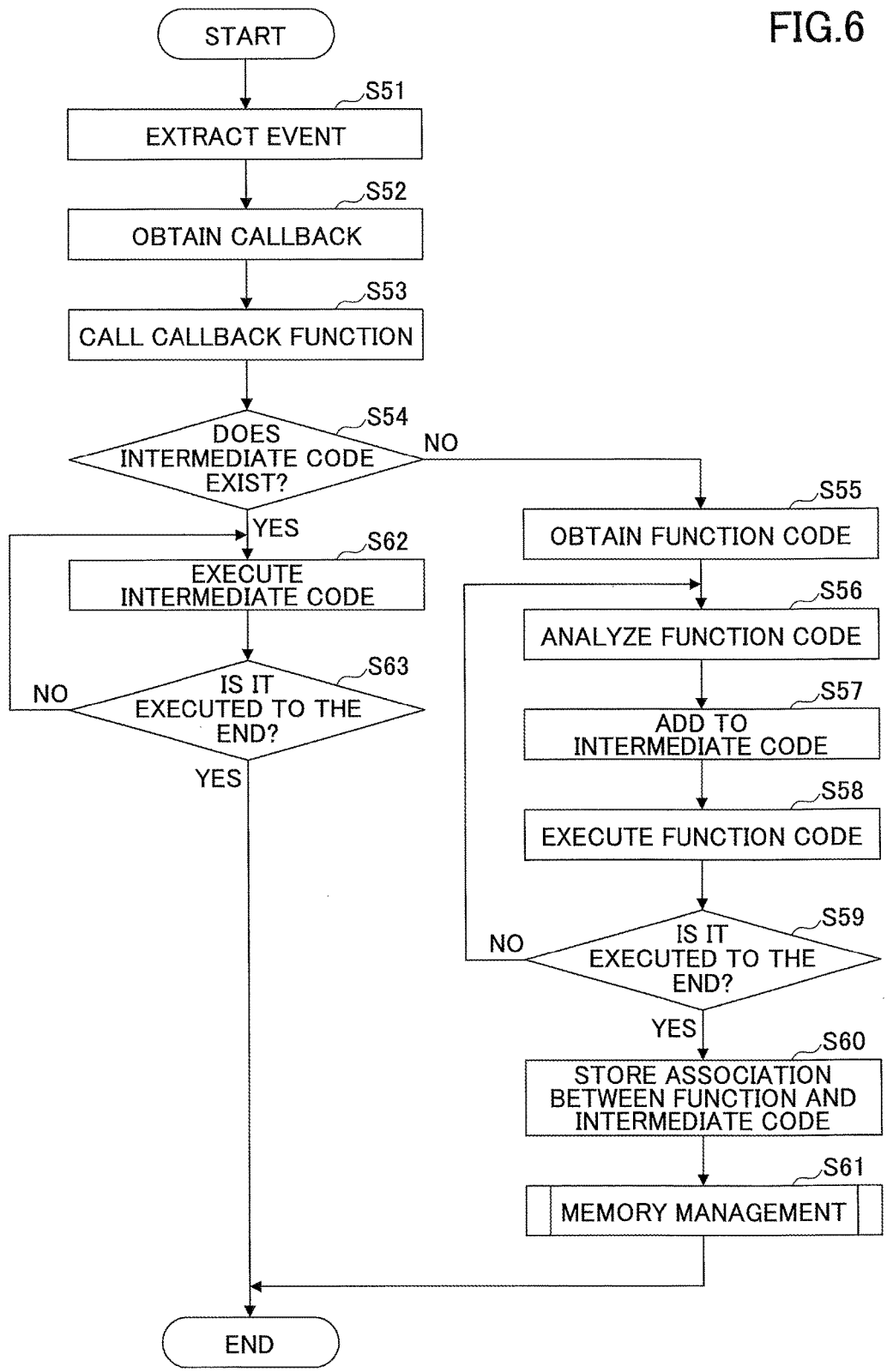

FIG.10

| FUNCTION NAME | GENERATION TIME | LATEST CALL TIME | THE NUMBER OF CALLS | CPU LOAD |
|---|---|---|---|---|
| func1 | 2014/3/29T15:40:12 | 2014/3/29T16:00:10 | 42 | 40% |
| func2 | 2014/3/29T15:49:44 | 2014/3/29T15:59:12 | 111 | 70% |
| ... | ... | ... | ... | ... | ical configuration of an information processing apparatus;

PROCESS EXECUTION METHOD AND INFORMATION PROCESSING APPARATUS

CROSS-REFERENCE TO RELATED APPLICATIONS

This application is based upon and claims the benefit of priority of the prior Japanese Priority Application No. 2014-101437 filed on May 15, 2014, the entire contents of which are hereby incorporated by reference.

FIELD

The disclosures herein generally relate to a process execution program, a process execution method, and an information processing apparatus.

BACKGROUND

The advent of Internet of Things, in which various things provide sensors, and connect with communication networks such as the Internet to exchange information, makes it possible to identify the things, to grasp states of the things, and to control the things. Among others, Web of Things has drawn attention that uses Web technologies to develop applications and services that cooperate with things. Discussion is going on in the World Wide Web Consortium (W3C) in terms of use cases, requirements, and implementation directions. This is because there are a great number of engineers who work on Web technologies, and are able to promote development of such applications and services, and consequently, users may enjoy various advantages.

Also, it is desirable that devices to be built in things are low spec devices in terms of costs and power consumption. Thereupon, microcomputer boards have been developed, to have JavaScript (trademark), which is one of Web technologies, operate on a small device. To be operational on a low spec embedded device, it is often the case to use a binary file in an executable format that is obtained by compiling a program written in, for example, C language. However, using a script language such as JavaScript is useful to operate a program on various devices because an application can be executed without compilation to obtain an executable format specific to an individual device.

Also, in recent years, wearable devices, such as a wrist watch-type terminal (smart watch) or an eyeglass-type terminal (smart glass), have begun to spread, which are low spec devices, yet people want to run general-purpose applications on them. To make such devices wide-spread, it is important to provide an environment in which a great number of developers can create applications, and Web technologies such as JavaScript increase their importance. On the other hand, a script language such as JavaScript has a problem in that its operational speed is slower than running a compiled binary executable. Therefore, various speeding up technologies have been implemented for JavaScript engines. For example, a JavaScript engine V8 by Google (trademark) has a just-in-time compiler built in, which is called "full-codegen" or "Crankshaft". When executing a source code in JavaScript, the engine reads the source code, compiles it, and then, executes it on a device.

RELATED-ART DOCUMENTS

Patent Documents

[Patent Document 1] Japanese Laid-open Patent Publication No. 2009-211190

[Patent Document 2] Japanese Laid-open Patent Publication No. 2002-163115

[Patent Document 3] Japanese Unexamined Patent Application Publication (Translation of PCT Application) No. 2013-516720

[Patent Document 4] Japanese Laid-open Patent Publication No. 2007-179153

However, the technology described above is targeted for comparatively high spec devices (information processing apparatuses) such as personal computers (PCs), smart phones, and the like, which require considerable resources (a high-performance central processing unit (CPU) and a large memory area) to execute a process. Also, a JavaScript engine for embedded use on a small device has a slow operational speed because it is executed by a simple interpreter, which sequentially analyzes (parses) a script without compilation, to be operational on a low spec device.

SUMMARY

According to at least one embodiment of the present invention, a non-transitory computer-readable recording medium has a program stored therein for causing a computer to execute a process of processing a program by repeating analysis and execution of a source code having been read. The process includes associating, when the source code includes a definition of a function, a function name identifying the function, with an intermediate representation of the source code corresponding to the function, to be stored; determining whether the intermediate representation having the function associated is stored, when calling the function; executing a procedure corresponding to the function, by using the intermediate representation, when the intermediate representation is stored; and generating the intermediate representation by analyzing the source code corresponding to the function, when the intermediate representation is not stored.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 6 is a flowchart illustrating an example of an event extraction process;

FIG. 10 is a diagram illustrating an example of a function use table.

DESCRIPTION OF EMBODIMENTS

In the following, embodiments of the present invention will be described with reference to the drawings.

<Functional Configuration Example of Information Processing Apparatus>

Figure 1:
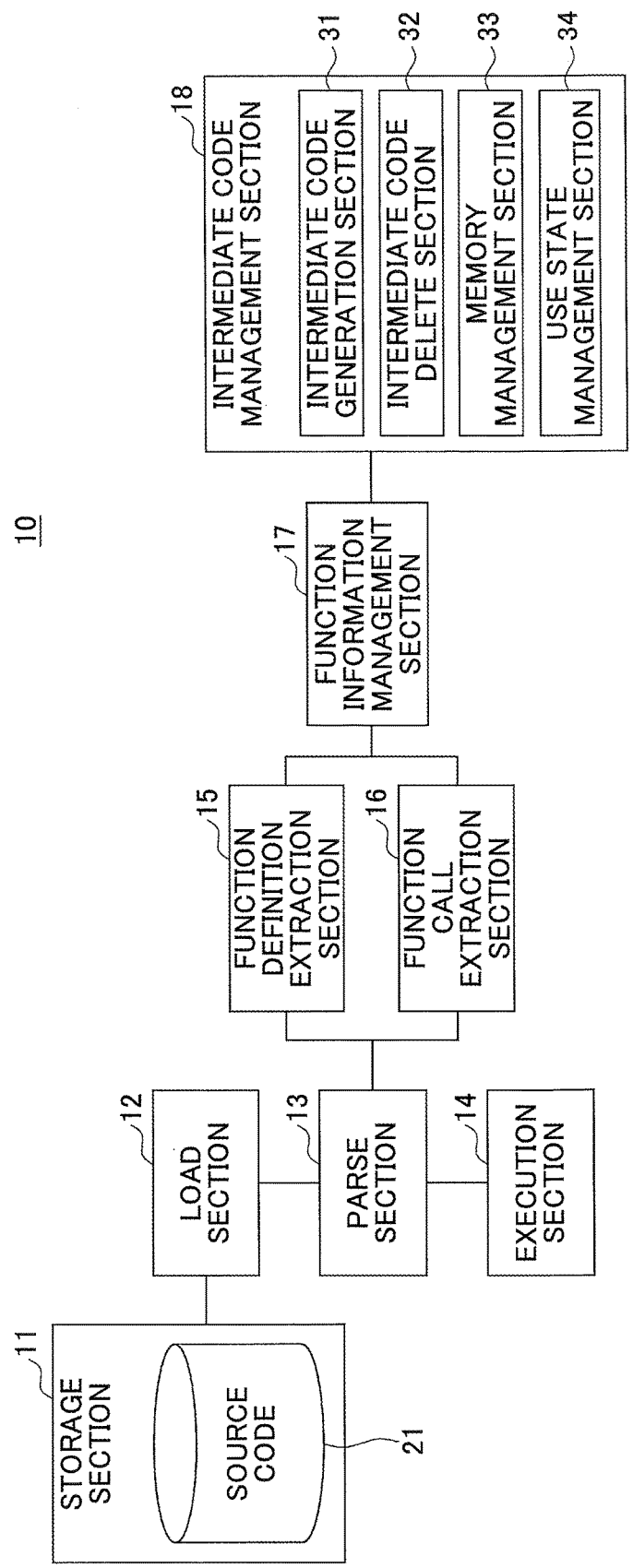
FIG. 1 is a diagram illustrating an example of a functional configuration of an information processing apparatus.

FIG. 1 is a diagram illustrating an example of a functional configuration of an information processing apparatus 10. The information processing apparatus 10 illustrated in an example in FIG. 1 includes a storage section 11, a load section 12 as an example of a read section, a parse section 13 as an example of an analysis section, an execution section 14, a function definition extraction section 15, a function call extraction section 16, a function information management section 17, and an intermediate code management section 18 as an example of an intermediate representation management section.

The storage section 11 stores source code and the like to execute various types of information processing that use JavaScript in the present embodiment. Note that the storage section 11 may store, for example, an intermediate representation (for example, an intermediate code), callback data, a function use table, various setting information, data obtained during an execution, an execution result (log), and the like. Intermediate representations are a collection of parsed results of functions included in the source code 21. In the memory, an intermediate representation is not represented in text, such as "variable", but is binary data having been replaced with symbols to be stored. Note that the intermediate representation is not limited to a code. The data included in the storage section 11 may read out by a section other than the load section 12. The storage section 11 may be a hard disk, a memory, or a combination of these.

The load section 12 reads the source code 21, which is written in a language such as JavaScript, into a memory (for example, a memory cache) from the storage section 11, to put it into a state so that the parse section 13 can analyze it.

The parse section 13 executes an analysis process (parsing) including a syntactic analysis and a semantic analysis on the source code 21 existing on the memory in order starting from the beginning of the source code description, to generate an executable program as the analysis result. Also, the parse section 13 may generate the executable program from an intermediate code managed by the function information management section 17. When executing a process from the intermediate code, the process can be sped up because time is not required for processing in the parse section 13.

The execution section 14 executes the process, by using the analysis result obtained by the parse section 13. Also, the execution section 14 can execute the process by using an intermediate code instead of the source code 21. A processed result executed by the execution section 14 may be stored in the storage section 11.

The function definition extraction section 15 extracts a function definition part in the source code 21, and outputs the extracted part to the function information management section 17.

The function call extraction section 16 extracts a function calling part in the source code 21, obtains the intermediate code or the source code corresponding to the function from the function information management section 17, and outputs it to the parse section 13.

The function information management section manages, for example, a correspondence among information about a function (for example, the function name and arguments), the source code and intermediate code of the function that is obtained from the function definition extraction section 15 and the function call extraction section 16. For example, when the function definition extraction section 15 determines that the source code 21 includes a definition of a function, the function information management section 17 associates the function name identifying the function, with the intermediate code of the source code corresponding to the function, and manages the association. Also, the function information management section 17 generates a tree structure (object management tree) of the obtained function as an example of an object, and manages the tree in the storage section 11 or an internal memory of the function information management section 17.

Also, the function information management section 17 may manage whether to register a function included in the source code 21 as a callback function. By registering the function as a callback, the registered function can be called to execute a process corresponding to a predetermined event after the script has been executed to the end.

The intermediate code management section 18 manages an intermediate code as an example of an intermediate representation. Also, the intermediate code management section 18 executes memory management and use state management, and executes, for example, generation and deletion of an intermediate code. For example, when an intermediate code does not exist, the intermediate code management section 18 generates the intermediate code. Also, depending on memory usage, the intermediate code management section 18 assigns priorities depending on use states and generation time of the intermediate codes, and deletes an intermediate code having a low priority.

Here, the intermediate code management section 18 will be specifically described. The intermediate code management section 18 includes an intermediate code generation section 31, an intermediate code delete section 32, a memory management section 33, and a use state management section 34.

An intermediate code itself described above, is managed by the function information management section 17, and when necessary, the intermediate code management section 18 calls at least one of functions among the intermediate code generation section 31, the intermediate code delete section 32, the memory management section 33, and the use state management section 34.

In response to a call from the intermediate code management section 18, the intermediate code generation section 31 generates an intermediate code from the source code of a function. In response to a call from the intermediate code management section 18, the intermediate code delete section 32 deletes an intermediate code. The memory management section 33 manages memory usage used for storing intermediate codes in the memory. Also, the memory management section 33 sets a reference (for example, a threshold) of the memory usage. Based on the information, the intermediate code management section determines whether to call the intermediate code delete section 32. The use state management section 34 manages information about when the intermediate code has been called; the frequency of calls; the generation time; the CPU load when called; the time required for generating the intermediate code; and the like. Based on the information, the intermediate code management section 18 determines which intermediate code of a function is to be deleted by the intermediate code delete section 32.

As described above, when processing a program by repeating analysis and execution of the read source code 21, the information processing apparatus 10 in the present embodiment has the intermediate code management section 18 manage intermediate codes, in addition to having the function information management section 17 manage information about a function (for example, the function name, arguments, and code in the function). By using the intermediate code, the program can be executed efficiently.

The information processing apparatus 10 is, for example, a PC or a tablet terminal, but not limited to these. For example, the information processing apparatus 10 may be a wearable device such as a smart watch, a smart glass, a glove-type or pendant-type device, or a sensor device (a temperature sensor or the like) installed in a predetermined environment. Also, these devices may be capable of directly connecting with the Internet for information communication, or connecting with a smart phone or the like by Bluetooth (trademark) (for example, Bluetooth Low Energy) or WiFi (trademark), for information communication. By using such communication capability, an application (program) written in JavaScript may be distributed to these devices (the information processing apparatuses 10).

<Hardware Configuration Example of Information Processing Apparatus 10>

Figure 2:
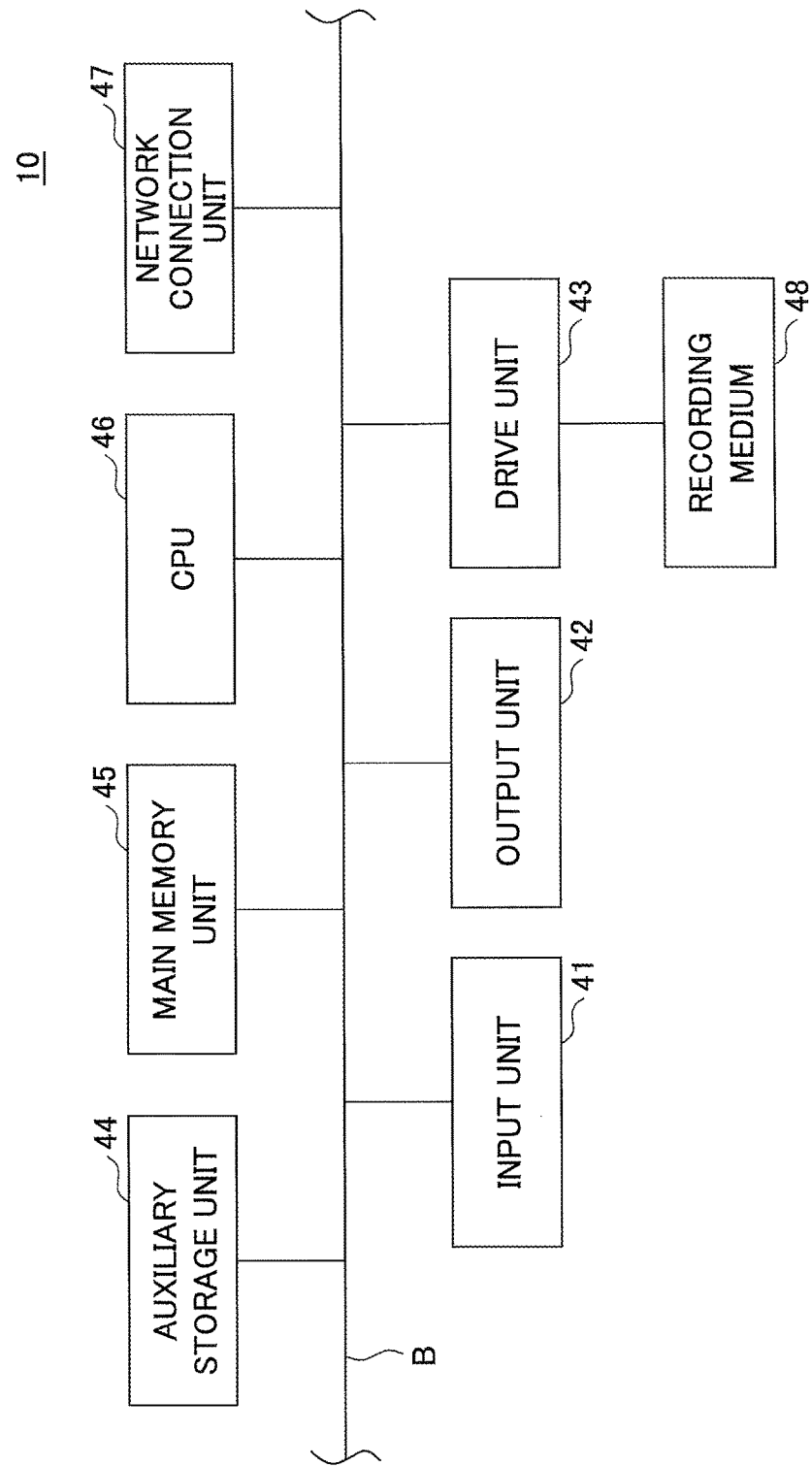
FIG. 2 is a diagram illustrating an example of a hardware configuration of an information processing apparatus.

Next, a hardware configuration example of the information processing apparatus 10 will be described by using the drawings. FIG. 2 is a diagram illustrating an example of a hardware configuration of the information processing apparatus 10. In the example in FIG. 2, the information processing apparatus 10 includes an input unit 41, an output unit 42, a drive unit 43, an auxiliary storage unit 44, a main memory unit 45, a CPU 46, and a network connection unit 47, which are mutually connected by a system bus B.

The input unit 41 includes a keyboard, a pointing device such as a mouse or the like, and a voice input device such as a microphone operated by a user or the like to receive as input an execution command of a program from the user or like, various operation information, information for activating software or the like, and the like.

The output unit 42 includes a display for displaying various windows, data and the like to operate the main body of the computer (the information processing apparatus 10) to execute processing according to the present embodiment. The output unit 42 displays an execution report and result or the like of a program by a control program held by the CPU 46.

Note that an execution program installed into the main body of the computer according to the present embodiment is provided, for example, with a recording medium 48 or the like. The recording medium 48 that stores the program can be set in the drive unit 43. The execution program is installed into the auxiliary storage unit 44 via the drive unit 43 from the recording medium 48 based on a control signal from the CPU 46.

The auxiliary storage unit 44 is, for example, a storage unit such as a hard disk drive, a solid state drive (SSD) or the like. The auxiliary storage unit 44, based on a control signal from the CPU 46, stores the execution program according to the present embodiment, a control program held in the computer, and the like, and executes inputting or outputting when necessary. The auxiliary storage unit 44, based on a control signal from the CPU 46, reads or writes required information from or to the stored information.

The main memory unit 45 stores the execution program and the like read from the auxiliary storage unit 44 by the CPU 46. The main memory unit 45 is a read-only memory (ROM), a random access memory (RAM), and the like. The auxiliary storage unit 44 and the main memory unit 45 correspond to, for example, the storage section 11 described above.

The CPU 46, based on a control program such as an operating system or the like and the execution program stored in the main memory unit 45, executes various calculations, inputs and outputs data to/from the hardware units, and controls the computer as a whole to implement various processing. Various information or the like required for an execution of a program may be obtained from the auxiliary storage unit 44, and an execution result and the like may be stored.

Specifically, the CPU 46, based on an execution command or the like of a program obtained from the input unit 41, for example, runs the program installed in the auxiliary storage unit 44 by loading the program into the main memory unit 45. For example, by executing the process execution program, the CPU 46 executes the processes described above such as a read process of the source code 21 by the load section 12, an analysis process of the source code by the parse section 13, and an execution process of the program corresponding to the script by the execution section 14. Also, by executing the process execution program, the CPU 46 executes the processes described above such as an extraction process of a function definition by the function definition extraction section 15, an extraction process of a function call by the function call extraction section 16, and a management process of function information by the function information management section 17. Also, by executing the process execution program, the CPU 46 executes a management process of an intermediate code by the intermediate code management section 18 described above. Contents to be processed by the CPU 46 are not limited to these. Contents executed by the CPU 46 may be stored in the auxiliary storage unit 44 if necessary.

The network connection unit 47 executes communication with an external device via a communication network such as the Internet, a LAN or the like. The network connection unit 47, based on a control signal from the CPU 46, establishes a connection with a communication network or the like to obtain the execution program, software, setting information, and the like from an external device or the like connected with the communication network. The network connection unit 47 can provide an execution result obtained by executing a program or the execution program itself to the external device or the like. The network connection unit 47 can implement wireless communication with the external device by using, for example, Bluetooth or WiFi described above.

The recording medium 48 is a recording medium that stores an execution program, and is readable by the computer as described above. The recording medium 38 may be a portable recording medium, for example, a semiconductor memory such as a flash memory or the like, a CD-ROM, a DVD, etc., but it is not limited to these.

By installing an execution program (for example, the process execution program) on the hardware configuration in FIG. 2, the script execution process can be implemented by cooperation of the hardware resources and the software according to the present embodiment.

<Example of Script Execution Process>

Next, an example of a script execution process will be described using a flowchart in embodiments of the present invention.

Script Execution Process: First Embodiment

Figure 3:
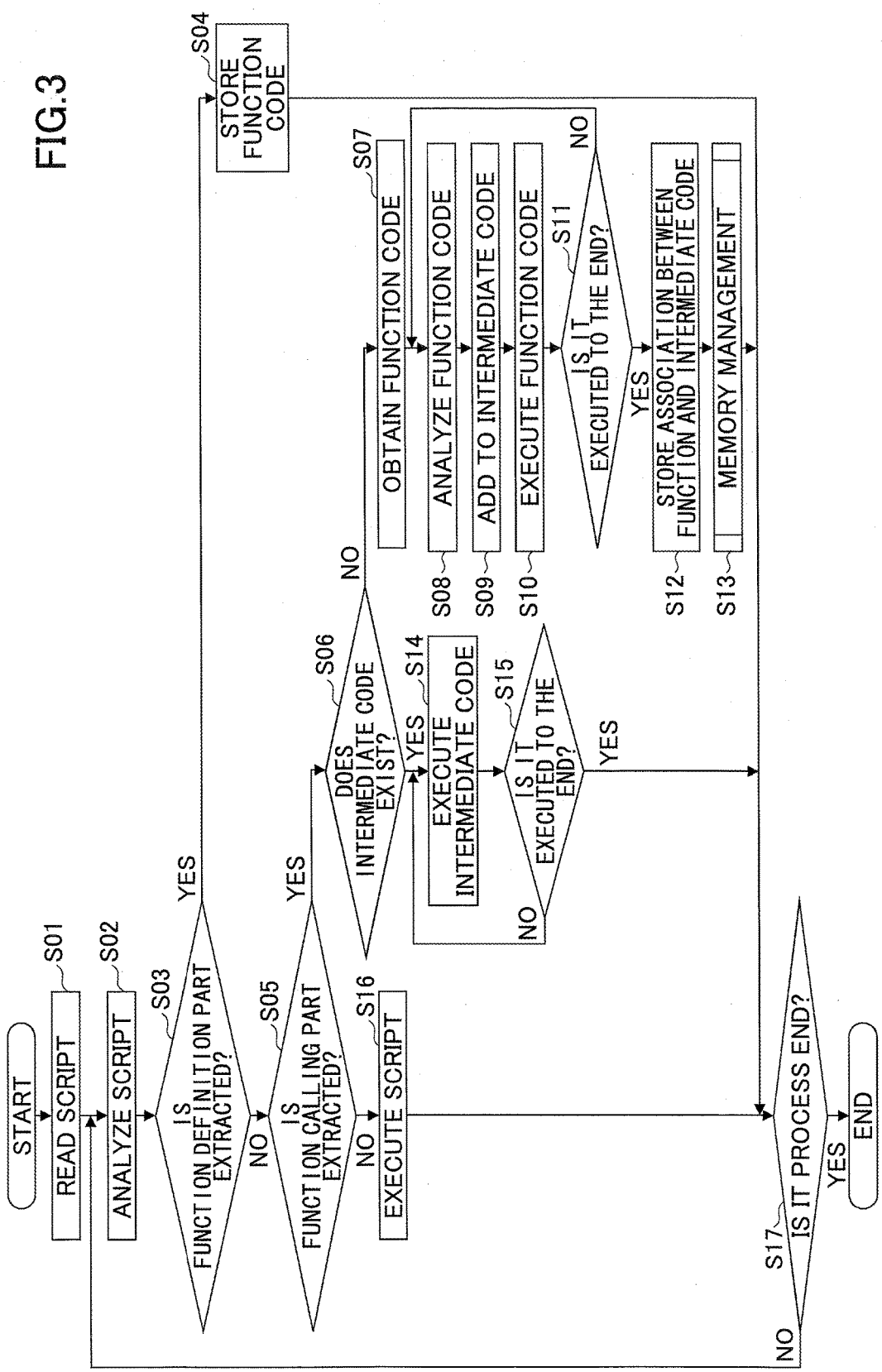
FIG. 3 is a flowchart illustrating an example of a script execution process according to a first embodiment.

FIG. 3 is a flowchart illustrating an example of a script execution process according to a first embodiment. In the example in FIG. 3, the load section 12 reads a source code 21 of JavaScript from the storage section 11 (Step S01), and the parse section 13 analyzes (parses) the script (Step S02).

Next, the function definition extraction section 15 determines whether a function definition part is extracted in an analysis result obtained at Step S02 (Step S03), and if extracted (YES at Step S03), stores the function code (Step S04). Also, if a function definition part is not extracted at Step S03 (NO at Step S03), the function call extraction section 16 determines whether a function calling part is extracted (Step S05).

If a function calling part is extracted (YES at Step S05), the function information management section 17 determines whether the intermediate code, which is an example of an intermediate representation, exists (Step S06). If the intermediate code exists (YES at Step S06), the intermediate code management section 18 obtains the function code (Step S07), analyzes the obtained function code (Step S08), and adds the analysis result to the intermediate code (Step S09).

Next, the execution section 14 executes the function code (Step S10), and determines whether the obtained function code has been executed to the end (Step S11). Note that if the code has not been executed to the end (NO at Step S11), the execution section 14 goes back to Step S08. If the code has been executed to the end at Step S11 (YES at Step S11), the function information management section 17 stores an association between the function and the intermediate code in the storage section 11 (Step S12). Next, the intermediate code management section 18 executes a management process of the memory which stores intermediate codes (memory management process) (Step S13).

Also, if the intermediate code exists at Step S06 (YES at Step S06), the execution section 14 executes the intermediate code (Step S14), and determines whether the intermediate code has been executed to the end (Step S15). If the code has not been executed to the end (NO at Step S15), the execution section 14 goes back to Step S14. Also, if a function calling part is not extracted at Step S05 (NO at Step S05), the execution section 14 executes the script analyzed at Step S02 (Step S16).

Note that after Step S04, S13, or S16, or if the code has not been executed to the end at Step S15 (YES at Step S15), it is determined whether the process ends (Step S17), and if the process does not end (NO at Step S17), the process goes back to Step S02, and executes, for example, an analysis process of a next script. Also, if the process ends at Step S17 (YES at Step S17), for example, when all read scripts have been analyzed or a user has issued an end command, the script execution process ends according to the first embodiment.

<Step S13: Example of Memory Management Process>

Figure 4:
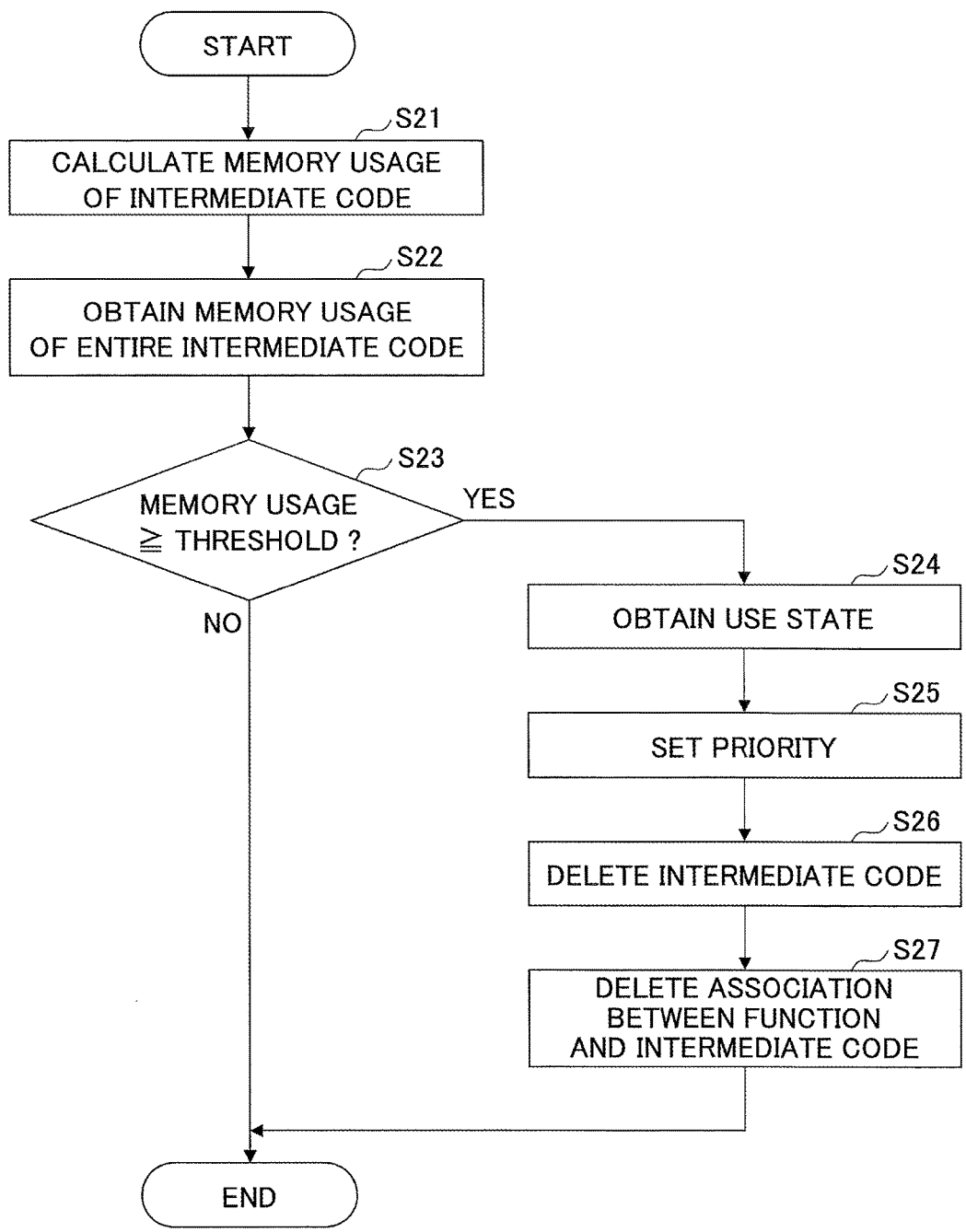
FIG. 4 is a flowchart illustrating an example of a memory management process.

Next, an example of the memory management process at Step S13 will be described using a flowchart. FIG. 4 is a flowchart illustrating an example of the memory management process. In the memory management process illustrated in FIG. 4, the intermediate code management section 18 calculates memory usage of intermediate codes (Step S21), and obtains the memory usage of all intermediate codes (Step S22).

Next, the intermediate code management section 18 determines whether the memory usage is greater than or equal to a predetermined threshold (Step S23), and if greater than or equal to the threshold (YES at Step S23), obtains use states (Step S24). The use state is, for example, information about when an intermediate code has been called, the frequency of calls, the generation time, the CPU load when called, and the time required for generating the intermediate code; but the information is not limited to these items.

Next, the intermediate code management section 18 sets priorities of the intermediate codes based on the obtained use states (Step S25). At Step S25, a low priority is set to a function that has not been called recently or a function that has a small number of calls, and conversely, a high priority is set for a function that has been called recently or a function that has a great number of calls, but it is not limited to these.

Next, the intermediate code management section 18 deletes intermediate codes having lower priorities in ascending order so that the memory usage is less than or equal to the threshold (Step S26), and for each intermediate code deleted at Step S26, deletes the association between the function and the intermediate code (Step S27).

Also, if the memory usage is not greater than or equal to the threshold at Step S23 (NO at Step S23), the memory management process ends.

Script Execution Process: Second Embodiment

Next, a script execution process will be described according to a second embodiment. The second embodiment assumes a small device having a sensor or the like as an example of an information processing apparatus (device) 10 connected by Web technologies. To have such a small device process information from the sensor efficiently in terms of power consumption, it is desirable that the CPU of the information processing apparatus 10 operates in response to receiving information from the sensor, and sleeps after the process ends.

Thereupon, the information processing apparatus 10 receives information obtained by the sensor or a communication as an event. Then, based on the received information, the information processing apparatus 10 executes a calculation, and depending on the calculation result, sends an information indication to another device (external apparatus). For example, the information processing apparatus 10 may receive an input event from a temperature sensor, executes a threshold checking to determine whether the temperature is over 30° C., and, for example, only if the temperature is over the threshold, may send an information indication to an external apparatus via a communication network.

An event-driven process for such a case is implemented by JavaScript. Therefore, the information processing apparatus 10 has a script function associated with the event, and transfers the function as a callback. Consequently, the transferred function is called when the event occurs. Since the function is called for each occurrence of the event, it is possible to make the execution of the function efficient. The script execution process described above will be described according to the second embodiment using a flowchart.

Figure 5:
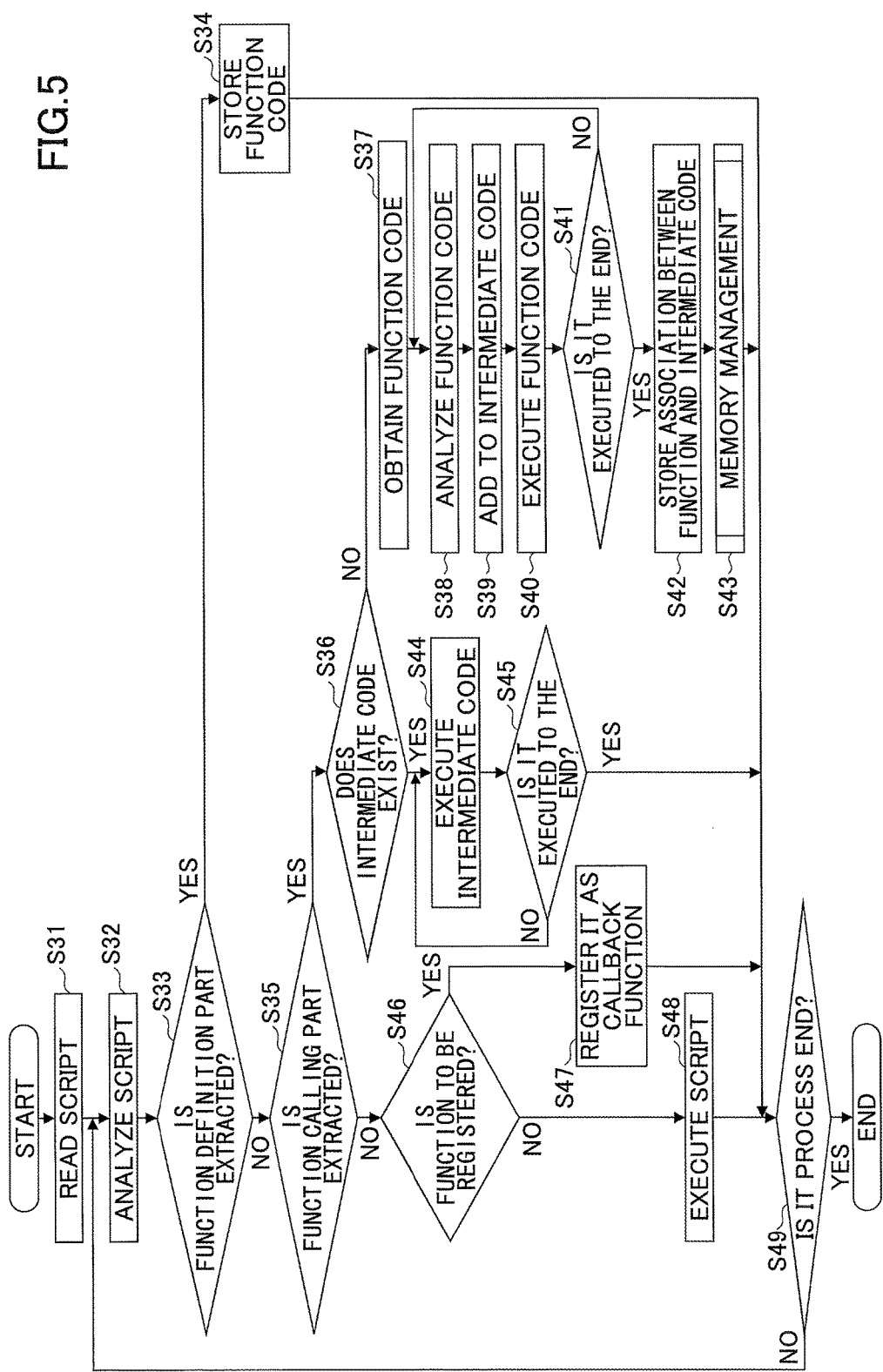
FIG. 5 is a flowchart illustrating an example of a script execution process according to a second embodiment.

FIG. 5 is a flowchart illustrating an example of the script execution process according to the second embodiment. In the script execution process in the second embodiment, Steps S31 to S45 are the same as Steps S01 to S15 in the script execution process in the first embodiment described above, and their description is omitted here.

At Step S35, the information processing apparatus 10 determines whether a function calling part is extracted (Step S35), and if a function calling part is not extracted (NO at Step S35), the function information management section 17 determines whether to register the function as a callback function (Step S46). If determining to register the function (YES at Step S46), the function information management section 17 registers it as a callback function (callback data) in the storage section 11 (Step S47). By registering the function as a callback function, the registered function can be called after a script has been executed to the end. Thus, the function is called in response to an occurrence of a predetermined event. For example, the function is called when a value is obtained by a sensor, or when a touch is made on a screen. Note that the event extraction operates independently from the execution of the JavaScript source code.

Also, at Step S46, if determining not to register the function (NO at Step S46), the script is executed (Step S48). Also, after Step S34, S43, S47, or S48, or if the code has been executed to the end at Step S45 (YES at Step S45), the information processing apparatus 10 determines whether to end the process (Step S49), and if determining not to end the process (NO at Step S49), goes back to Step S32. If determining to end the process (YES at Step S49), the information processing apparatus 10 ends the script execution process according to the second embodiment.

<About Event Extraction Process>

Here, an event extraction process that corresponds to FIG. 5 will be described using a flowchart. FIG. 6 is a flowchart illustrating an example of an event extraction process. In the example in FIG. 6, the information processing apparatus 10 extracts a predetermined event (Step S51), obtains a callback that corresponds to the event (Step S52), and calls the corresponding callback function in the callback data registered in the storage section 11 (Step S53).

Next, the function information management section 17 determines whether the intermediate code exists (Step S54). If the intermediate code exists (YES at Step S54), the intermediate code management section 18 obtains the function code (Step S55), analyzes the obtained function code (Step S56), and adds the analysis result to the intermediate code (Step S57).

Next, the execution section 14 executes the function code (Step S58), and determines whether the obtained function code has been executed to the end (Step S59). Note that if the code has not been executed to the end (NO at Step S59), the execution section 14 goes back to Step S56. If the code has been executed to the end at Step S59 (YES at Step S59), the function information management section 17 stores an association between the function and the intermediate code in the storage section 11 (Step S60). Also, the intermediate code management section executes a memory management process described above (Step S61).

Also, if the intermediate code exists at Step S54 (YES at Step S54), the execution section 14 executes the intermediate code (Step S62), and determines whether the intermediate code has been executed to the end (Step S63). If the code has not been executed to the end (NO at Step S63), the execution section 14 goes back to Step S62. If the code has been executed to the end at Step S63 (YES at Step S63), or after Step S61, the process ends. Note that the event extraction process in FIG. 6 is executed as described above for each occurrence of the event.

<Example of Architecture and Implementation of Present Embodiment>

Figure 7A:
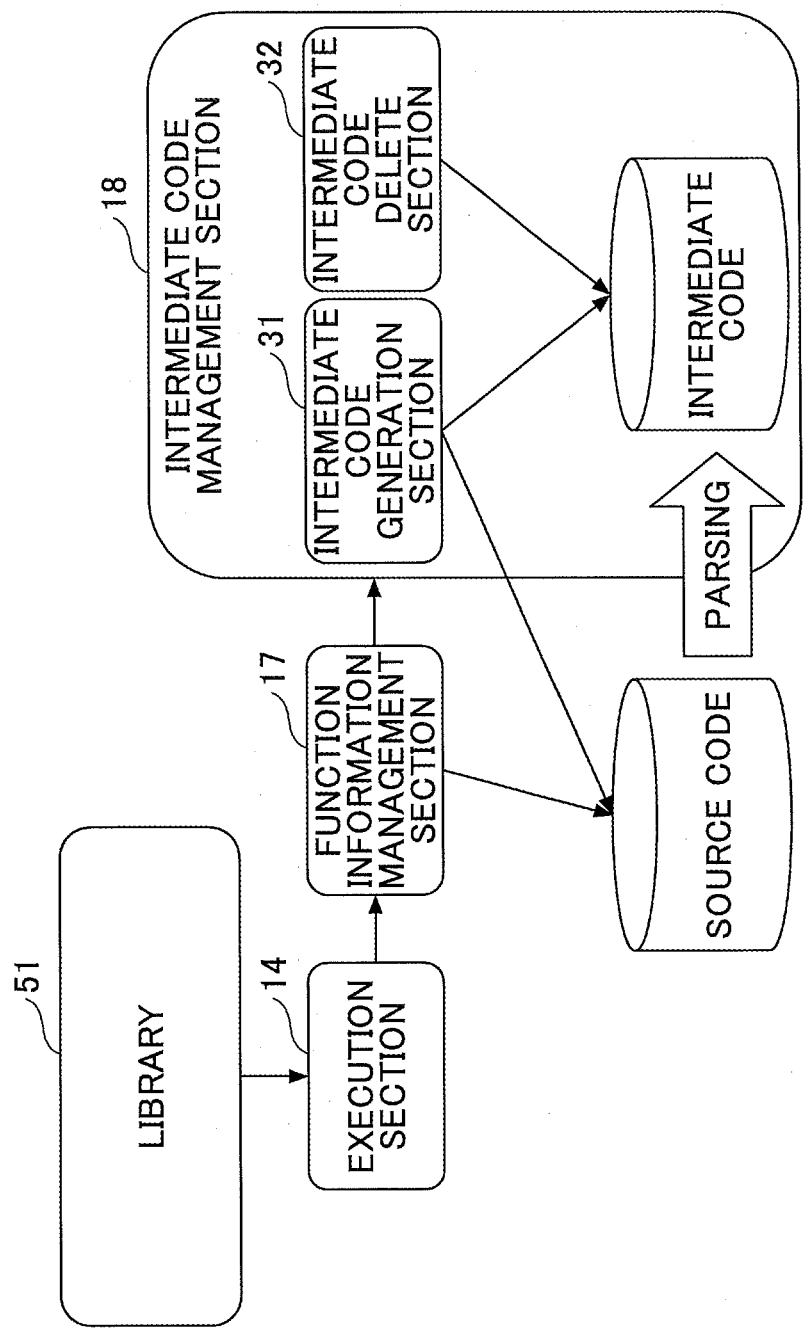
FIGS. 7A-7B are diagrams illustrating an example of architecture and an implementation in an embodiment.
Figure 7B:
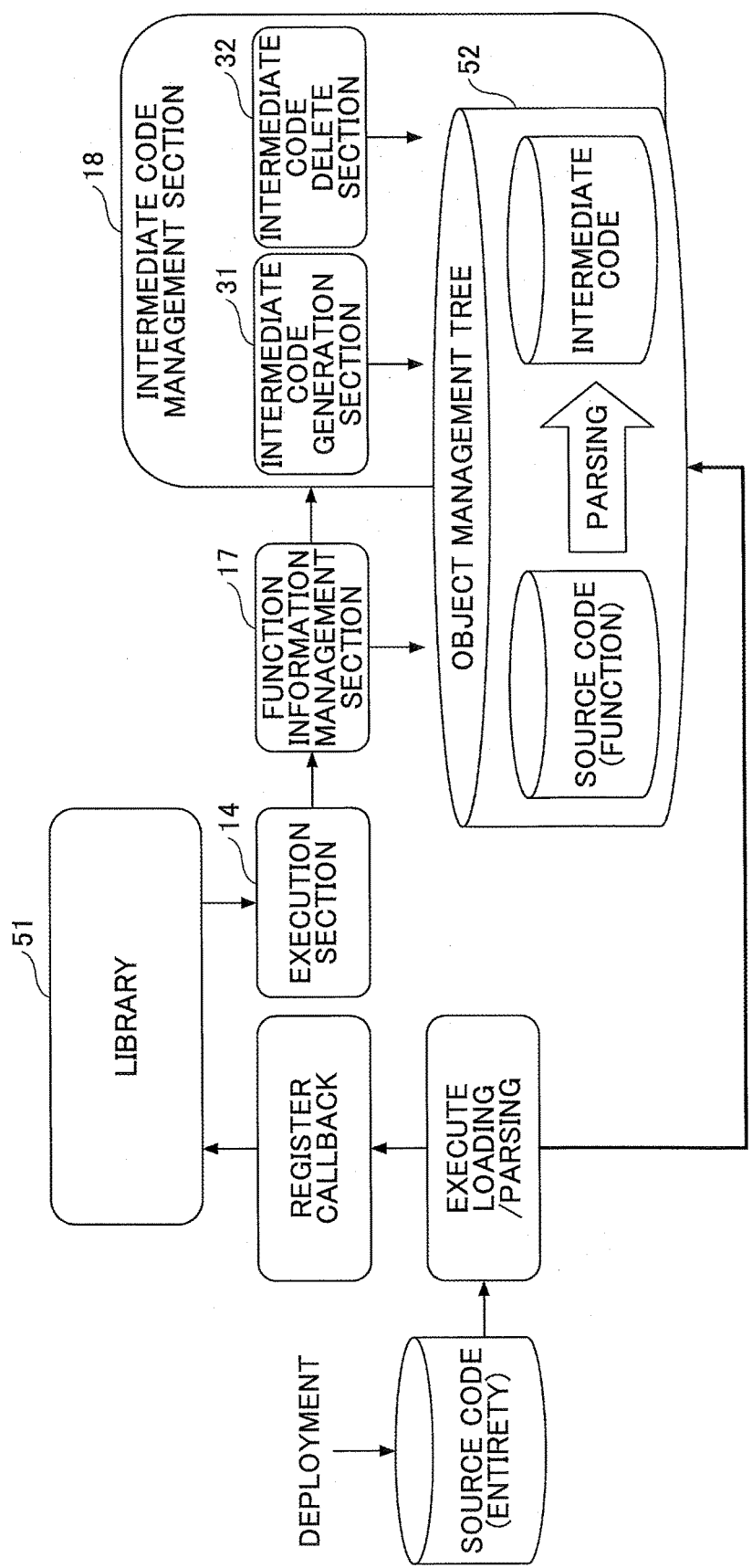

Next, using the information processing apparatus 10 in the present embodiment described above, an example of architecture and an implementation that makes execution of a script function efficient, will be specifically described using the drawings. FIGS. 7A-7B are diagrams illustrating an example of architecture and an implementation in the present embodiment. FIG. 7A illustrates an architecture example to make execution of a script function efficient, and FIG. 7B illustrates an implementation example of a JavaScript engine that implements the architecture. Note that, in the example in FIGS. 7A-7B, a part of the functional configuration of the information processing apparatus 10 in the present embodiment is generally illustrated.

In the configuration of the architecture illustrated in FIG. 7A, a library 51 calls a function registered as a callback, for example, following an occurrence of an event in a sensor or a communication (reception/transmission). For example, the library may be an event-loop function that waits for an event, for example, based on the sensor or the communication, and if an event occurs, reads a function registered as a callback.

Also, in response to a call from the library 51 or the event loop described above, the execution section 14 obtains the source code or the intermediate code of the function from the function information management section 17, and executes the code.

The function information management section manages the source code of the function. Also, upon a request from the execution section 14, the function information management section 17 returns the source code or intermediate code of the function. Upon a request from a function information management function, the intermediate code management section 18 returns the intermediate code of the function. If necessary, the intermediate code management section generates an intermediate code by parsing the source code of the function, or deletes the intermediate code.

Specifically, if a requested intermediate code of the function does not exist, the intermediate code management section 18 generates the intermediate code by the intermediate code generation section 31, and returns the intermediate code, or if the code exists, returns it without generation. Also, since memory capacity is required for storing generated intermediate codes in the storage section 11, a function is provided for deleting predetermined intermediate codes by the intermediate code delete section 32 if intermediate codes are not required any more, or the vacant memory space is not sufficient for too many intermediate codes.

In the present embodiment, when an intermediate code is not used, namely, when the function information management section 17 returns a source code, typical operations of a JavaScript interpreter are executed. Also, in the present embodiment, by using the intermediate code instead of the source code, a process to parse the function can be omitted, and the process time can be shortened. Since parsing is a process to execute a lexical analysis and a syntactic analysis of a text written in JavaScript, it takes time. Therefore, by using the present embodiment, a considerable effect is obtained in shortening the process time. Note that, in an event-driven model illustrated in FIG. 7A, most functions that correspond to respective events are repeatedly called as respective functions. Therefore, in the present embodiment, intermediate codes are managed for respective functions.

Also, in the example illustrated in FIG. 7B, after the source code of JavaScript has been loaded, the source code is repeatedly parsed and executed in order from its beginning (loading/parsing/execution). Then, a function, which is an example of an object obtained by execution, is managed as a tree structure (an object management tree 52) in the memory such as the storage section 11. By using the object management tree 52, the object can be obtained and accessed for the next time and after.

Note that if a function definition is obtained when parsing the source code 21, the function is set to have the function name, the arguments, and the source code of the function part associated, and added to the object management tree to be managed. Also, when the function is registered as a callback, the event and the function are associated with each other through the library 51 to be stored.

Having the function registered as a callback, the function is to be called when a corresponding event occurs. When calling the function, the source code that corresponds to the called function is obtained by using the object management tree 52, via the function information management section 17. Next, the parse section 13 analyzes the source code of the obtained function part. Then, the execution section 14 executes the process using the analysis result (function execution). Namely, the present embodiment can be implemented by expanding the functional part in the function information management section 17, to have the function in the intermediate code management section 18 operate. Note that the intermediate code managed here is, for example, binary data that has a list of tree structures generated from results obtained by parsing respective statements in the source code of the function.

For example, as illustrated FIG. 7B, an object management tree is expanded to be associated with the intermediate code, in addition to being associated with the function name and the source code. Then, if the corresponding intermediate code exists, the function information management section 17 returns the intermediate code, instead of obtaining the source code of the function from the object management tree by the function name used for the function call.

The execution section 14 executes the intermediate code. If the intermediate code does not exist, the intermediate code management section 18 generates the intermediate code while parsing and executing the source code of the function, and has the object management tree associated with the generated intermediate code and the function name, to be stored. Thus, for calls for the next time and after, the execution can be done by the intermediate code, and speeding up is realized.

Note that, in the method described above, generation of an intermediate code is limited only for a called function. Even if limited as such, for example, a memory area is required for storing intermediate codes. Therefore, if there are a lot of functions, the memory usage may be too much for a small device. Therefore, a function is added that deletes intermediate codes by the intermediate code delete section 32. The memory usage used by intermediate codes is managed so that when the memory usage is over a predetermined value, some intermediate codes of functions are deleted, and associations in the object management trees 52 are rewritten. Consequently, when a function whose intermediate code has been deleted is called, it can be executed normally.

<Intermediate Code Generation and Object Management Tree>

Next, the intermediate code generation and the object management tree will be specifically described using the drawings according to the present embodiment.

Figure 8A:
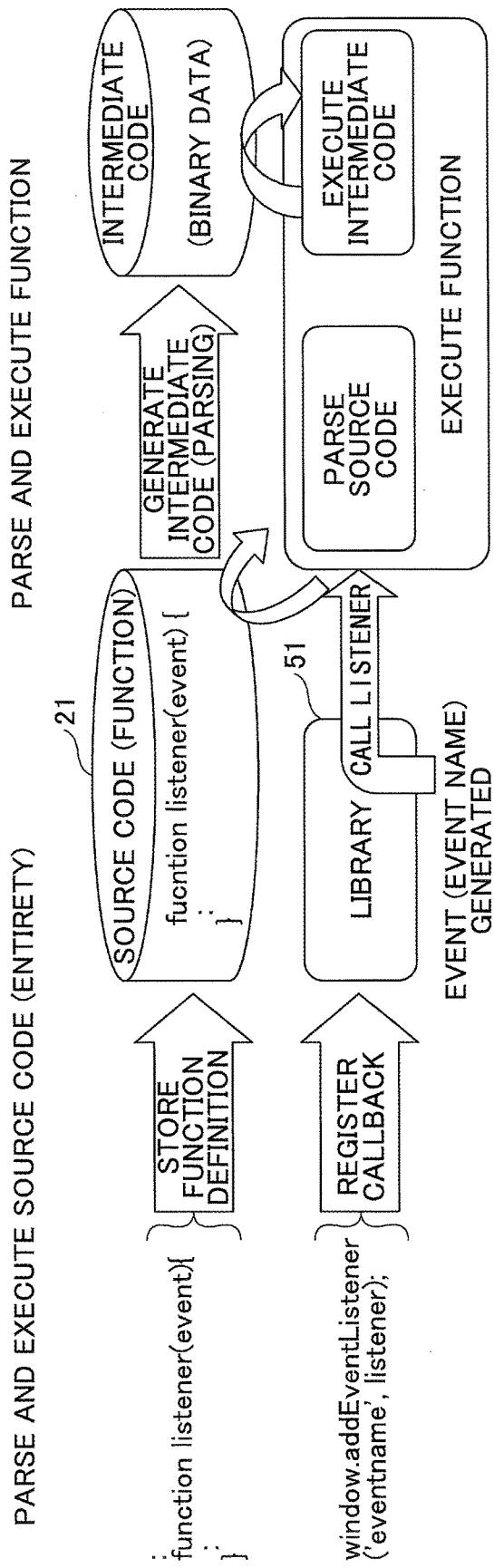
FIGS. 8A-8B are diagrams illustrating intermediate code generation and an object management tree.
Figure 8B:
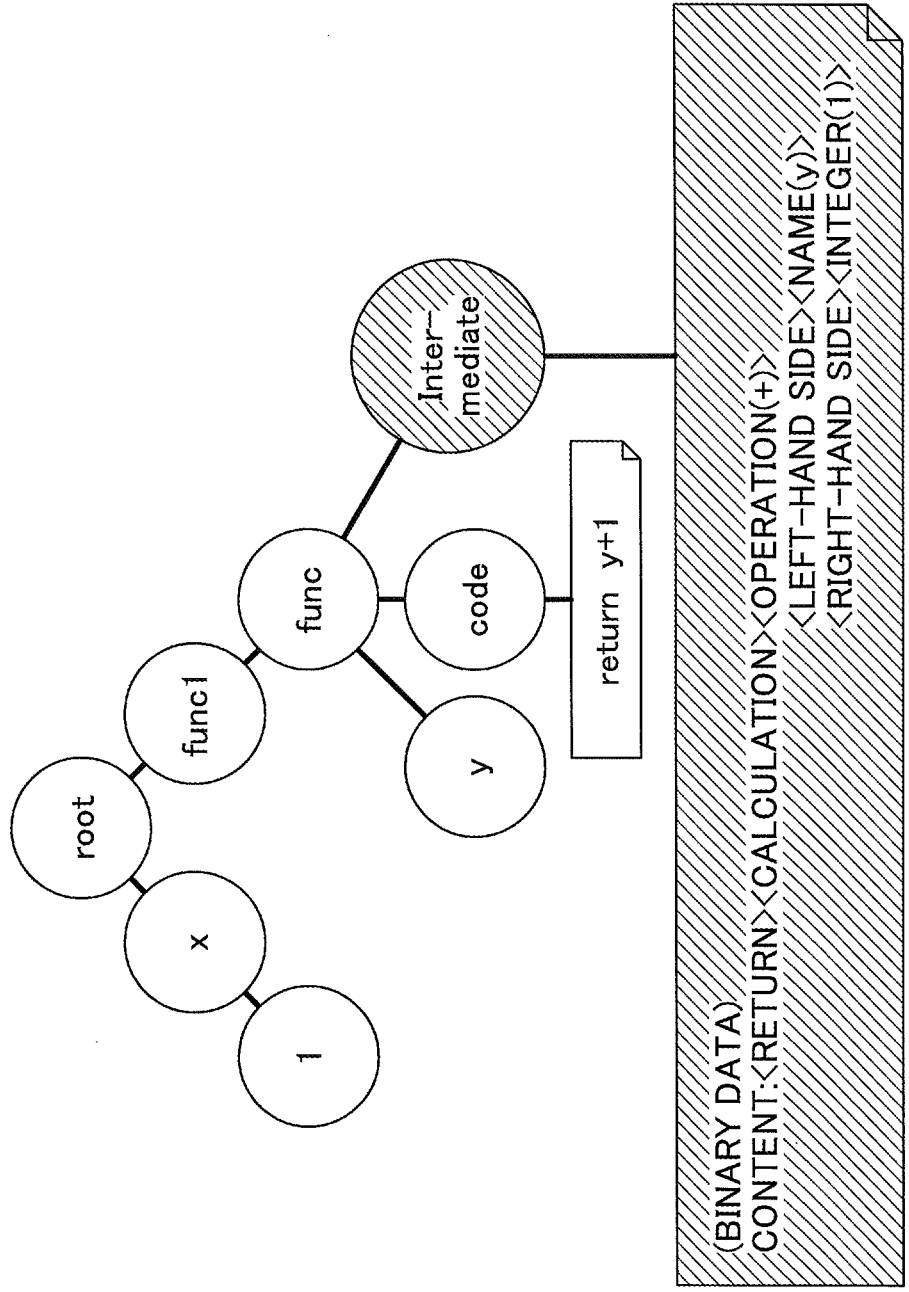

FIGS. 8A-8B are diagrams illustrating the intermediate code generation and the object management tree. For example, given a JavaScript source as illustrated on the left side in FIG. 8A, a function definition part starting with a keyword "function" is extracted to be managed. In the present embodiment, for example, as illustrated in FIG. 8A, a library call starting with a keyword "window" is executed, and registered as a callback. Then, when a corresponding event occurs, the registered function is called (in this case, "listener"). At this moment, if the intermediate code exists, the intermediate code is executed. If the intermediate code does not exist, the source is parsed to be executed, as well as to generate the intermediate code. The intermediate code generated here is stored as binary data having associated with the function (in this case, "listener").

In this case of intermediate code generation, first, the source code of the JavaScript is a series of representations (expressions) written in text. For example, consider a simple source code below.

var x;
x=1;

Given the above source code, the JavaScript engine has, for example, the parse section 13 analyze the code to obtain the following representations by a lexical analysis and a syntactic analysis.

<variable declaration (x)><name (x)>
<assignment><left-hand side><name (x)>
 <right-hand side><integer (1)>

The first line of the representations described above is a statement of variable declaration in JavaScript that is represented as a tree structure. Also, the second line of the representations described above is a statement of assignment that is represented as a tree structure by analyzing both the left-hand side and the right-hand side. Then, a list is generated from these, and stored as the intermediate code in the memory. Note that, for the sake of explanation, although the description above is written in text, actual contents in the memory are represented as binary data having respective values of the representations.

Next, the object management tree will be described, which is generated during an execution. For example, assume the following source code.

```
var x = 1;
function func1 (y) {
  return y + 1;
}
```

As a result of executing the source code, an integer 1 is added to a variable object x, and an argument "y" and a line of the source code "return y+1;" are added to a function object func1, in an object management tree 52. FIG. 8B (other than slant-lined parts) illustrates an image of the object management tree 52.

Here, when the function is called, based on the function name used, the function is searched for using the object management tree 52, and if the intermediate code exists, the intermediate code in a series of representations is obtained to be executed. If the intermediate code does not exist, the intermediate code is generated, to be added as a function object in the object management tree 52 to be managed. This is illustrated by the slant-lined parts in FIG. 8B.

As described above, according to the present embodiment, high-performance architecture of a JavaScript engine can be implemented, which operates on the assumed event-driven model running on, for example, a small device. Consequently, it is possible to have a script engine efficiently operate on a small device that works on simple operations.

Also, by providing a management function of memory usage, a function to specify a part for generating an intermediate representation, and a function to partially generate intermediate representations, it is possible to avoid the problem of excessive memory usage due to generation of intermediate representations. The memory usage is fairly smaller than that used when compiling an entire code.

Figure 9:
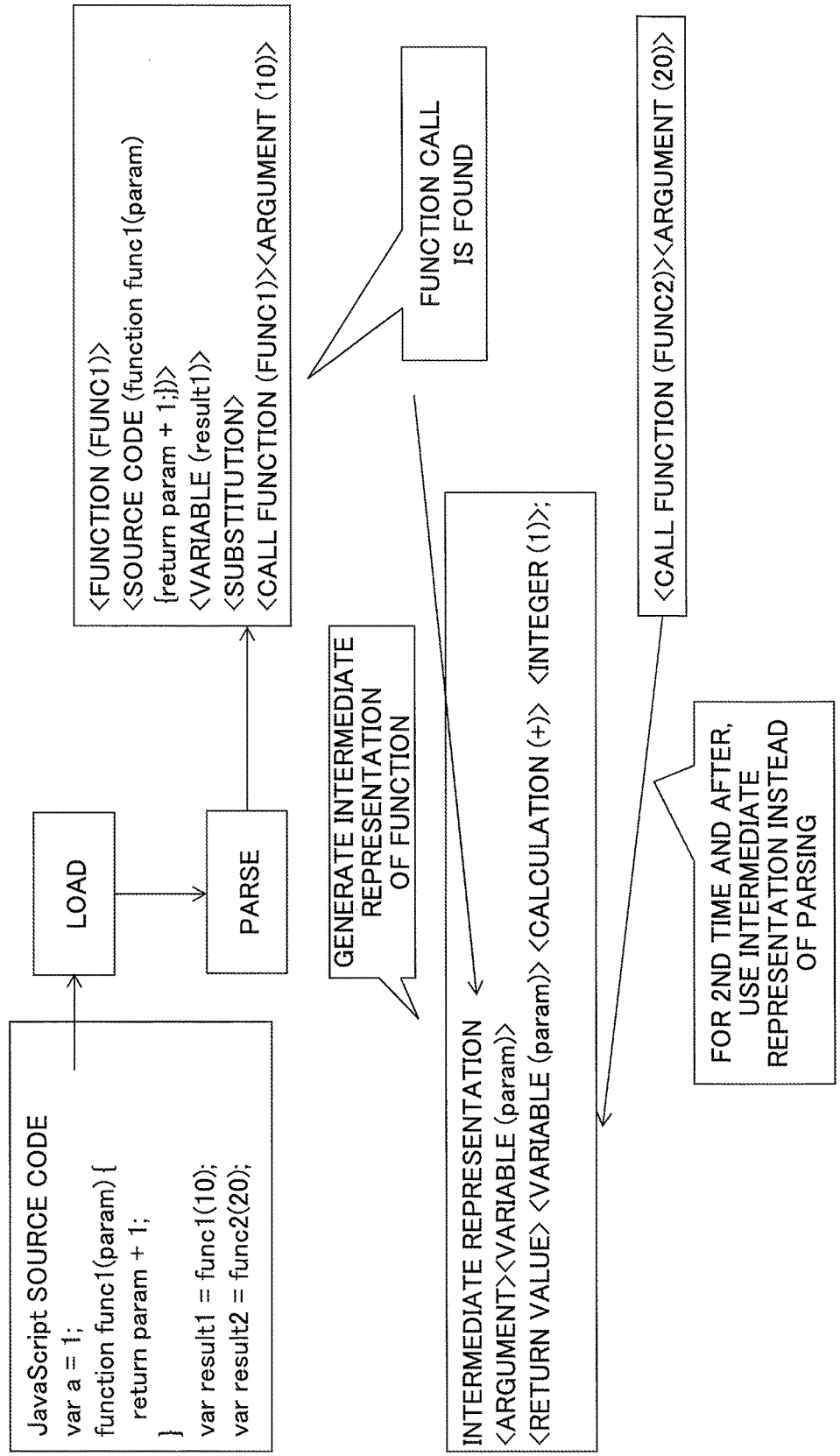
FIG. 9 is a diagram illustrating an operational overview according to an embodiment.

Here, an operational example of an execution process in the present embodiment will be described using a specific JavaScript source code. FIG. 9 is a diagram illustrating an operational overview according to the present embodiment. Since an intermediate representation is originated from a script, it has a value in a variable during an execution as illustrated in FIG. 9. For example, in the JavaScript source code illustrated in FIG. 9, when executing "param+1", a calculation of "10+1" may be executed when given the argument "10". However, since the intermediate representation may have a different argument when called for the next time (in the example in FIG. 9, the argument "20"), the variable part needs to be generated as a variable whose value can be replaced during execution.

Thereupon, in the present embodiment, repeatedly executed calls in the JavaScript source code are made efficient, as illustrated in FIG. 9. According to the present embodiment, as described above, when executing parsing for the first time, information obtained as the parsed result (analysis result) is stored, so that the information can be used for executions for the second time and after, to omit the parsing process.

For example, when a source code in JavaScript is given, the JavaScript source code is read in the memory, parsed in order from the beginning, executed based on the parsed result, and the parsing and execution are repeated. For example, as illustrated in FIG. 9, when the following source code is given,
var a=1;
it is interpreted as having a meaning of "<variable declaration><substitution><integer>", and based on the meaning, the variable "a" is associated with an integer 1. And this process is to be repeated. Thereupon, in the present embodiment, the execution is sped up by generating the intermediate representation when calling a function. Also, as illustrated in FIG. 9, suppose that the following source code is given.

```
function func1 (param) {
  return param + 1;
}
var result1 = func1 (10);
var result2 = func1 (20);
```

For the first three lines, or a function definition part, only an association between a function name and the source code is stored.
For a function call on the fourth line (var result1=func1 (10);), the source code corresponding to the function name is parsed to generate an intermediate representation to be added to the association, and then, the corresponding process is executed. Also, for a function call on the fifth line (var result2=func1 (20);), instead of parsing (or without parsing), the corresponding process can be executed using the intermediate representation that has already been generated, which can be obtained from the association.

In this way, in the present embodiment, time for generating an intermediate representation (intermediate code) of a function is required only when processing the first function call, and no parsing is required for the second call and after. Consequently, it is possible to have a script engine efficiently operate on a small device that works on simple operations.

Also, in the present embodiment, by providing a management function of memory usage, a function to specify a part for generating an intermediate representation, and a function to partially generate intermediate representations in the intermediate code management section 18, it is possible to avoid the problem of excessive memory usage due to generation of intermediate representations. Also, in the present embodiment, the memory usage is fairly smaller than that used when compiling an entire code.

<About JavaScript Engine>

The JavaScript engine parses and executes a part that is called a "global source", which is not included in a function. Therefore, for example, the JavaScript engine interprets the first line "var a=1;" in the JavaScript source code illustrated in FIG. 9 described above. In this case, it means that <variable (a)><substitute (=)><integer (1)>. The next couple of lines mean that there is a definition of a function. These lines are interpreted as <function (func1)><argument (param)><source (<return param+1;>)>. These objects (variable (a) and function (func1)) may be used later. Therefore, they need to be managed so that they can be found when a reference or a call is made in a later part. Therefore, they are managed, for example, in a tree structure as illustrated in FIG. 8B described above. Thus, if the value of the variable "a" is to be used later, the value can be obtained by tracing this object management tree 52. If the function func1 is to be called later, the source code of the function func1 can be obtained by tracing this object management tree 52. Then, if the function func1 is actually called as in the last two lines in the example described above, the JavaScript engine obtains the source code of func1, and then, executes the source code.

In the present embodiment, the object management tree 52 is expanded so that it can manage an intermediate representation in addition to the source code that corresponds to an object. A part of data designated by "Intermediate" in FIG. 8B described above corresponds to an intermediate representation. When a function is called, the JavaScript engine searches for an object having a corresponding name, and further confirms whether the object has the intermediate representation. If the object has the intermediate representation, the JavaScript engine obtains the intermediate representation instead of the source code, and executes the JavaScript by using the intermediate representation. If the object does not have the intermediate representation, the JavaScript engine obtains the source code, converts the source code into the intermediate representation, and adds the obtained intermediate representation to the object management tree 52. Then, the JavaScript engine executes the JavaScript by using the intermediate representation.

Note that in the memory, an intermediate representation is not represented in text, such as "variable", but is binary data having been replaced with symbols to be stored. When executing with an intermediate representation, the process is sped up because no time is required for parsing. On the other hand, since this method generates and stores intermediate representations, the memory usage may be greater. Greater memory usage is a big problem for an embedded device assumed in the present embodiment. Therefore, it is important to control memory usage due to this method, not exceeding a certain range. Therefore, in the present embodiment, the intermediate code management section 18 manages the memory usage of intermediate representations.

For example, when generating an intermediate representation, the intermediate code management section 18 calculates the data size of binary data corresponding to the intermediate representation. Then, the intermediate code management section 18 adds this data size to the memory usage of intermediate representations. Then, if the memory usage exceeds a certain value (threshold), the intermediate code management section 18 deletes at least one of the intermediate representations. Note that which one is to be deleted may be determined by a method that randomly deletes one of them, or a priority-based method that prioritizes one that has not been used recently; one having a few calls; or one having been generated earlier, but the methods are not limited to these. Also, to implement the deletion described above, for example, a function use table may be stored in the storage section 11 for management.

FIG. 10 is a diagram illustrating an example of a function use table. The function use table illustrated in FIG. 10 is stored, for example, in the storage section 11, and reads and writes can be performed when necessary. In the example in FIG. 10, each function has stored items of "generation time", "latest call time", "the number of calls (times)", and "CPU load (%)", but the number of functions and/or types of the stored items are not limited to these. In this way, functions can be managed respectively, and based on the stored function information, one of the functions can be selected for deleting its intermediate representation. Note that as for the deletion, for example, if the memory usage exceeds the upper limit even if the intermediate representation of one function has been deleted, the intermediate representation of another function is further deleted.

Also, the function use table may be used for selecting one of the functions for generating an intermediate representation. Also, the function use table may be managed in an expanded object management tree, or may be managed in a separate table. This makes it possible to avoid excessive memory usage. Note that the threshold for determining the memory usage, which cannot be exceeded, may be, for example, a fixed value, or may be dynamically changed based on the size of the empty memory area, which may be obtained from an OS or the like. Note that when a function has its intermediate representation deleted, and the function is called again, the intermediate representation does not exist, and hence, the intermediate representation is generated again.

<Examples of Memory Usage Reduction>

Next, examples of memory usage reduction will be described in the intermediate code management section 18 described above. Note that the following embodiments describe examples of memory usage reduction when an intermediate code is generated or deleted.

First Example

As described above, by generating intermediate codes, much memory may be used up while time passes. Thereupon, in the first example, a usable memory is determined for storing intermediate codes, and the memory usage of the stored intermediate codes is managed. Also, in the first example, the memory usage is calculated if a generated intermediate code is to be stored, and if exceeding the upper limit, one of the stored intermediate codes is deleted.

Also, by placing an intermediate code into a memory cache, and using the intermediate code when the same function is called for the next time, a part of the process can be reduced.

As selection criteria for an intermediate code to be deleted, at least one of the methods may be chosen among selecting one that has not been used recently; selecting one that has been less frequently used during a certain period; and selecting one that was generated earlier.

Using the methods, selected intermediate codes are deleted until the memory usage is contained within a predetermined threshold. Note that the selection criteria are not limited to these. Thus, overuse of the memory capacity can be avoided, and a device having, for example, a small memory capacity can be used.

Second Example

In the second example, the memory usage is calculated if a generated intermediate code is to be stored, and if exceeding the upper limit, one of the stored intermediate codes is written into a file, and deleted from a memory cache. Also, by using the intermediate code when the same function is called for the next time, a part of the process can be reduced. Also, when a function having its intermediate code written in the file is called, the intermediate code is read into the memory cache to be executed. As described above, writing into a file and deleting from the memory cache are executed.

Note that if the intermediate code is written into the file, that information (for example, a filename) may be added to, for example, the object management tree 52, and if the function is called, based on the object management tree 52, the file may be loaded to use the loaded intermediate code.

Also, in the second example, as selection criteria for an intermediate code to be deleted, it is preferable to use at least one of the methods, as described above, among selecting one that has not been used recently; selecting one that has been less frequently used during a certain period; and selecting one that was generated earlier, and to delete intermediate codes until the memory usage is contained within the predetermined threshold. Thus, overuse of the memory capacity can be avoided, and a device having, for example, a small memory capacity can be used.

Third Example

In the third example, time is measured when generating an intermediate code, and the memory usage is managed for stored intermediate codes. Also, the memory usage is calculated if a generated intermediate code is to be stored, and if exceeding the upper limit, at least one of the intermediate codes that has been stored is deleted based on the generation time.

Time required for generating intermediate codes varies with contents of a source code from which the intermediate codes are to be generated. Therefore, in the third example, the intermediate code management section 18 manages time required for generating an intermediate code, and when deletion is required, selects a target by using the time information. The time information may be managed, for example, by using the function use table, or may be managed by the object management tree 52 as described above. An intermediate code having a short generation time is not a burden in terms of performance even if it is generated again.

Thus, overuse of the memory capacity can be avoided, and a device having, for example, a small memory capacity can be used. Also, speeding up can be expected because regeneration is avoided for intermediate codes having longer generation time.

Fourth Example

In the fourth example, the CPU load of a device (information processing apparatus 10) is used for managing intermediate codes to be generated or to be deleted. It is often the case that a function in JavaScript is called in response to a certain event such as receiving data generated by a user operation or a communication, or receiving information from a sensor, and such events tend to be related to others, and to occur consecutively. For example, when a user operates a device, operational events such as touching and swiping may occur consecutively. Conversely, there may be a single event such as a timer event, which causes a function call once per minute.

In these cases, the former types of events frequently make function calls, and it is desirable that they are processed faster to obtain quicker responses, whereas the latter types of events may be processed slower than the former. Therefore, in the fourth example, it is preferable to monitor the CPU load, and to use an intermediate code for a part where the CPU load is high. Also, in the present example, the CPU load is managed when a function is called, and the intermediate code of the function is deleted if the CPU load is low when the function is called. Furthermore, in the fourth example, conversely, only if a function is called many times, the corresponding intermediate code may be stored. This can be implemented by managing the number of calls for each function in the function use table.

Fifth Example

For example, since it takes time to generate intermediate codes, if functions are not frequently called, intermediate code generation may make the overall performance slower. Therefore, in the fifth example, predetermined comment information is attached to functions, and based on the comment information, it is determined whether to generate intermediate codes. For example, in the fifth example, a predetermined comment is embedded in a source code (for example, a comment "//@nogen" is attached before a function), and/or a naming convention is adopted for function names (for example, "nogen" is attached as the suffix of a function name).

In the fifth example, for example, a user (developer) specifies functions for which intermediate representations are not to be stored. In this case, it should not impede the feature of versatility of JavaScript (JavaScript can operate wherever a JavaScript engine exists). Therefore, for example, the information is described as a comment. Alternatively, a method may be used that adopts the naming convention of function names. Using these methods, a source code looks as follows.

```
//@nogen
function func1 (param) {
  return param + 1;
}
function func2 (param) {
  return param + 2;
}
function func3_nogen (param) {
  return param + 3;
}
```

In the example described above, for func1 having a comment "@nogen" attached, the intermediate code is not to be stored, and for func3_nogen having a suffix "_nogen" in the function name, the intermediate code is not to be stored. The process of the fifth example can be implemented, for example, by expanding the object management tree 52 to manage information that specifies not to generate an intermediate code. Also, the fifth example has a user (developer) set the information, which can realize a more effective method. In this way, unnecessary intermediate codes are not generated, and hence, an execution can run faster, and the memory usage can be decreased.

Sixth Example

Also, since it is not useful to generate intermediate representations for unused codes, for example, error handling that is hardly used, a measure needs to be taken for such codes. Thereupon, in the sixth example, intermediate codes are generated while being executed. And, the intermediate code is not generated for a part that is not to be executed (for example, a not-executed branch of an if statement).

Then, in the sixth example, a part that is not executed is left as is the source code, and if the part is executed for a next execution, the intermediate code of the part is generated.

In the sixth example, for example, an intermediate code is generated first for an entire function, and next, the intermediate code is executed. However, it can be processed in the same way as an interpreter that sequentially repeats interpretation followed by execution. By adopting the method in the sixth example, it is possible to generate intermediate codes for a part of the source code. For example, consider a function below.

```
function func4 (a) {
  if (a > 0) {
    return a;
  } else {
    return -a;
  }
  var result = func4 (-1) ;
```

In this case, a function call is made on the last line, by "var result=func4 (-1);" with an argument -1, and the source code of the function func4 is obtained. Then, the first line is interpreted as <branch><condition <variable (a)><comparison (>)><integer (0)>>, to be set as the intermediate representation. Next, the result can be calculated as the execution is going on. Since "a" has the value -1, the intermediate representation only needs to include the else branch. Thus, it is interpreted as <conditional execution (else)><return value><calculate (-)><variable (a)>, and the intermediate representation is generated just for this interpretation. Then, the execution returns 1. In this way, only a part can be generated. In a function, there is a part that is hardly used. By not generating the intermediate code for such a part, the memory can be effectively used. Note that, if a=1 and an execution for the reverse condition is required, then, the intermediate code can be generated and added for that part. In this way, unnecessary intermediate codes are not generated, and hence, execution can run faster, and the memory usage can be decreased.

As described above, according to the present embodiment, a program can be executed efficiently. Also, according to the present embodiment, by generating and deleting intermediate representations, for example, depending on the memory usage, the memory capacity can be measured and managed when generating intermediate representations.

For example, time for generating an intermediate representation (intermediate code) of a function is required only when processing the first function call, and no parsing is required for the second call and after. Therefore, it is possible to have a script engine efficiently operate, for example, on a small device that works on simple operations. Also, according to the present embodiment, excessive memory usage can be avoided, which could be caused by generating intermediate representations. Also, according to the present embodiment, the memory usage is fairly smaller than that used when compiling an entire application or program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having a program stored therein for causing a computer to execute a process of processing a program by repeating analysis and execution of a source code having been read, the process comprising:
   storing a tree structure, in which a source code of a function is associated with a function name to be positioned lower than the function name, in a memory upon extracting a function definition portion by the analysis;
   determining whether an intermediate representation corresponding to an analysis result is associated with the function name indicated by a function calling part upon extracting the function calling part from the source code of the function by the analysis;
   generating the intermediate representation by acquiring and analyzing the source code by using the function name from the tree structure, when the intermediate representation is not associated with the function name indicated by the function calling part;
   storing the generated intermediate representation with association of the function name and positioning the generated intermediate representation lower than the function name in the tree structure; and
   adding an association between the function and the generated intermediate representation in the tree structure until executing an end of the source code having been read for the analysis and the execution.

2. The non-transitory computer-readable recording medium, as claimed in claim 1, the process further comprising:
   managing a memory usage of a storage section used for storing one or more of intermediate representations; and
   deleting at least one of the intermediate representations having been stored in the storage section, when the memory usage is greater than or equal to a predetermined threshold when the intermediate representation having been generated by the generating is to be stored in the storage section.

3. The non-transitory computer-readable recording medium, as claimed in claim 2, the process further comprising:
   managing a use state for each of the intermediate representations; and
   selecting one of the intermediate representations to be deleted from the storage section, depending on the use state.

4. The non-transitory computer-readable recording medium, as claimed in claim 2, the process further comprising:
   managing generation time for each of the intermediate representations; and
   selecting one of the intermediate representations to be deleted from the storage section, depending on the generation time.

5. The non-transitory computer-readable recording medium, as claimed in claim 1, the process further comprising:
   determining whether to generate the intermediate representation, based on a CPU load of the computer when executing the function included in the source code.

6. The non-transitory computer-readable recording medium, as claimed in claim 1, the process further comprising:
   determining whether to generate the intermediate representation, based on comment information included in the source code.

7. The non-transitory computer-readable recording medium, as claimed in claim 1, wherein the generating generates the intermediate representation only for a part of the function being executed for a first call of the function, not for the function as a whole,
   wherein the generating generates the intermediate representation for another part of the function, when the other part is executed for a next or following call of the function.

8. The non-transitory computer-readable recording medium, as claimed in claim 1, the process further comprising:
   registering a function included in the source code as a callback function to be called when a predetermined event having been associated with the function occurs.

9. The non-transitory computer-readable recording medium, as claimed in claim 1, wherein the process further comprises:
   executing an analyzed source code when the function calling part is not extracted.

10. A method of processing a program by repeating analysis and execution of a source code having been read, executed by an information processing apparatus, the method comprising:
    storing a tree structure, in which a source code of a function is associated with a function name to be positioned lower than the function name, in a memory upon extracting a function definition portion by the analysis;
    determining whether an intermediate representation corresponding to an analysis result is associated with the function name indicated by a function calling part upon extracting the function calling part from the source code of the function by the analysis;
    generating the intermediate representation by acquiring and analyzing the source code by using the function name from tree structure,
    when the intermediate representation is not associated with the function name indicated by the function calling storing the generated intermediate representation with association of the part;
    storing the generated intermediate representation with association of the function name and positioning the generated intermediate representation lower than the function name in the tree structure; and adding an association between the function and the generated intermediate representation in the tree structure until executing an end of the source code having been read for the analysis and the execution.

11. The method as claimed in claim 10, the method further comprising:

executing an analyzed source code when the function calling part is not extracted.

12. An information processing apparatus, processing a program by repeating analysis and execution of a source code having been read, comprising:

a memory; and a hardware processor coupled to the memory and the hardware processor configured to store a tree structure, in which a source code of a function is associated with a function name to be positioned lower than the function name, in a memory upon extracting a function definition portion by the analysis;

determine whether an intermediate representation corresponding to an analysis result is associated with the function name indicated by a function calling part upon extracting the function calling part from the source code of the function by the analysis;

generate the intermediate representation by acquiring and analyzing the source code by using the function name from the tree structure, when the intermediate representation is not associated with the function name indicated by the function calling part;

store the generated intermediate representation with association of the function name and position the generated intermediate representation lower than the function name in the tree structure; and add an association between the function and the generated intermediate representation in the tree structure until executing an end of the source code having been read for the analysis and the execution.

13. The information processing apparatus as claimed in claim 12, wherein the hardware processor further configured to execute an analyzed source code when the function calling part is not extracted.

* * * * *